(12) United States Patent
Dorin et al.

(10) Patent No.: US 11,571,667 B2
(45) Date of Patent: Feb. 7, 2023

(54) ISOPOROUS MESOPOROUS ASYMMETRIC BLOCK COPOLYMER MATERIALS WITH MACROVOIDS AND METHOD OF MAKING THE SAME

(71) Applicant: TeraPore Technologies, Inc., South San Francisco, CA (US)

(72) Inventors: Rachel M. Dorin, San Carlos, CA (US); Yibei Gu, San Francisco, CA (US); Jayraj K. Shethji, San Francisco, CA (US); Spencer Robbins, San Carlos, CA (US)

(73) Assignee: TeraPore Technologies, Inc., South San Francisco, CA (US)

( * ) Notice: Subject to any disclaimer, the term of this patent is extended or adjusted under 35 U.S.C. 154(b) by 52 days.

(21) Appl. No.: 16/980,021

(22) PCT Filed: Mar. 12, 2019

(86) PCT No.: PCT/US2019/021780
§ 371 (c)(1),
(2) Date: Sep. 11, 2020

(87) PCT Pub. No.: WO2019/178045
PCT Pub. Date: Sep. 19, 2019

(65) Prior Publication Data
US 2021/0008507 A1    Jan. 14, 2021

Related U.S. Application Data

(60) Provisional application No. 62/641,637, filed on Mar. 12, 2018.

(51) Int. Cl.
*B01D 71/80* (2006.01)
*B01D 67/00* (2006.01)
(Continued)

(52) U.S. Cl.
CPC ......... *B01D 71/80* (2013.01); *B01D 67/0009* (2013.01); *B01D 69/02* (2013.01);
(Continued)

(58) Field of Classification Search
CPC ........ B01D 2325/021; B01D 2325/025; B01D 69/02; B01D 69/10; B01D 71/80
See application file for complete search history.

(56) References Cited

U.S. PATENT DOCUMENTS 3,673,272 A    6/1972  Dean
4,014,798 A    3/1977  Rembaum
(Continued)

FOREIGN PATENT DOCUMENTS

CA    2886437 A1    5/2014
CA    3022510 A1    11/2017
(Continued)

OTHER PUBLICATIONS

Peinemann et al. (Nature Materials, Dec. 6, 2007, p. 992-996) "Asymmetric superstructure formed in a block copolymer via phase separation" (Year: 2007).*
(Continued)

*Primary Examiner* — Ryan B Huang
(74) *Attorney, Agent, or Firm* — Innovators Legal

(57) ABSTRACT

A mesoporous isoporous asymmetric material includes at least one diblock or multiblock copolymer, wherein the material has a transition layer having a thickness of at least 300 nm and a low macrovoid density, and the material has a sub-structure adjacent to said transition layer and said sub-structure comprises a high macrovoid density. A method for producing mesoporous isoporous asymmetric materials having macrovoids can include: dissolving at least one diblock or multiblock copolymer in a solution, the solution having one or more solvents and one or more nonsolvents,
(Continued)

to form a polymer solution; dispensing the polymer solution onto a substrate or mold, or through a die or template; removing at least a portion of solvent and/or nonsolvent from the polymer solution to form a concentrated polymer solution; and exposing the concentrated polymer solution to a nonsolvent causing precipitation of at least a portion of the polymer from the concentrated polymer solution.

7 Claims, 4 Drawing Sheets

(51) Int. Cl.
  B01D 69/02 (2006.01)
  B01D 69/10 (2006.01)
(52) U.S. Cl.
  CPC ........ B01D 69/10 (2013.01); *B01D 2325/021* (2013.01); *B01D 2325/022* (2013.01); *B01D 2325/025* (2013.01); *B01D 2325/04* (2013.01)

(56) References Cited

U.S. PATENT DOCUMENTS

| | | | |
|---|---|---|---|
| 4,399,035 A | 8/1983 | Nohmi et al. | |
| 4,666,991 A | 5/1987 | Matsui et al. | |
| 4,720,343 A | 1/1988 | Walch et al. | |
| 4,880,441 A * | 11/1989 | Kesting | B01D 71/68 |
| | | | 95/55 |
| 5,114,585 A | 5/1992 | Kraus et al. | |
| 5,130,024 A | 7/1992 | Fujimoto et al. | |
| 5,158,721 A | 10/1992 | Allegrezza et al. | |
| 5,647,989 A | 7/1997 | Hayashi et al. | |
| 5,700,902 A | 12/1997 | Hancock et al. | |
| 5,700,903 A | 12/1997 | Hancock et al. | |
| 5,792,227 A | 8/1998 | Kahlbaugh et al. | |
| 5,805,425 A | 9/1998 | Peterson | |
| 5,907,017 A | 5/1999 | Ober et al. | |
| 5,928,792 A | 7/1999 | Moya | |
| 6,033,370 A | 3/2000 | Reinbold et al. | |
| 6,241,886 B1 | 6/2001 | Kitagawa et al. | |
| 6,354,443 B1 | 3/2002 | Moya | |
| 6,379,796 B1 | 4/2002 | Uenishi et al. | |
| 6,503,958 B2 | 1/2003 | Hughes et al. | |
| 6,565,782 B1 | 5/2003 | Wang et al. | |
| 6,592,764 B1 | 7/2003 | Stucky et al. | |
| 6,592,991 B1 | 7/2003 | Wiesner et al. | |
| 6,663,584 B2 | 12/2003 | Griesbach, III et al. | |
| 7,056,455 B2 | 6/2006 | Matyjaszewski et al. | |
| 7,438,193 B2 | 10/2008 | Yang et al. | |
| 7,927,810 B2 | 4/2011 | Togawa et al. | |
| 8,025,960 B2 | 9/2011 | Dubrow et al. | |
| 8,147,685 B2 | 4/2012 | Pritchard | |
| 8,206,601 B2 | 6/2012 | Bosworth et al. | |
| 8,294,139 B2 | 10/2012 | Marsh et al. | |
| 8,939,294 B2 | 1/2015 | Moore et al. | |
| 9,162,189 B1 | 10/2015 | Aamer et al. | |
| 9,169,361 B1 | 10/2015 | Aamer | |
| 9,193,835 B1 | 11/2015 | Aamer | |
| 9,441,078 B2 | 9/2016 | Aamer | |
| 9,469,733 B2 | 10/2016 | Aamer et al. | |
| 9,527,041 B2 | 12/2016 | Wiesner et al. | |
| 10,711,111 B2 | 7/2020 | Wiesner et al. | |
| 10,912,868 B2 | 2/2021 | Ushiro et al. | |
| 2003/0073158 A1 | 4/2003 | Ma | |
| 2003/0171560 A1 | 9/2003 | Peters | |
| 2003/0226818 A1 | 12/2003 | Dunbar et al. | |
| 2004/0065607 A1 | 4/2004 | Wang et al. | |
| 2004/0122388 A1 | 6/2004 | McCormack et al. | |
| 2004/0126778 A1 | 7/2004 | Lemmens et al. | |
| 2004/0129678 A1 | 7/2004 | Crowley et al. | |
| 2004/0138323 A1 | 7/2004 | Stenzel-Rosebaum et al. | |
| 2004/0242822 A1 | 12/2004 | Gawrisch et al. | |
| 2006/0014902 A1 | 1/2006 | Mays et al. | |
| 2006/0085062 A1 | 4/2006 | Lee et al. | |
| 2006/0094598 A1 | 5/2006 | Simon | |
| 2006/0151374 A1 | 7/2006 | Wu et al. | |
| 2006/0283092 A1 | 12/2006 | Chinone | |
| 2007/0029256 A1 | 2/2007 | Nakano et al. | |
| 2007/0265174 A1 | 11/2007 | Schlenoff | |
| 2007/0287241 A1 | 12/2007 | Takahashi et al. | |
| 2008/0097271 A1 | 4/2008 | Lo et al. | |
| 2008/0193818 A1 | 8/2008 | Mays | |
| 2008/0261255 A1 | 10/2008 | Tolosa et al. | |
| 2009/0173694 A1 | 7/2009 | Peinemann et al. | |
| 2009/0181315 A1 | 7/2009 | Spatz et al. | |
| 2009/0208726 A1 | 8/2009 | Yang et al. | |
| 2009/0209726 A1 | 8/2009 | Matsumoto et al. | |
| 2009/0239381 A1 | 9/2009 | Nishimi et al. | |
| 2010/0051546 A1 | 3/2010 | Vuong et al. | |
| 2010/0108599 A1 * | 5/2010 | Vizvardi | B01D 69/12 |
| | | | 521/50 |
| 2010/0167271 A1 | 7/2010 | Ryan | |
| 2010/0181288 A1 | 7/2010 | Tang et al. | |
| 2010/0219383 A1 | 9/2010 | Eklund | |
| 2010/0224555 A1 | 9/2010 | Hoek et al. | |
| 2011/0130478 A1 | 6/2011 | Warren et al. | |
| 2011/0240550 A1 | 10/2011 | Moore et al. | |
| 2011/0275077 A1 | 11/2011 | James et al. | |
| 2012/0048799 A1 | 3/2012 | Na et al. | |
| 2012/0318741 A1 | 12/2012 | Peinemann et al. | |
| 2013/0053748 A1 | 2/2013 | Cotton | |
| 2013/0112613 A1 | 5/2013 | Kang et al. | |
| 2013/0129972 A1 | 5/2013 | Xu | |
| 2013/0193075 A1 | 8/2013 | Liang et al. | |
| 2013/0344375 A1 | 12/2013 | Brant et al. | |
| 2014/0005364 A1 | 1/2014 | Gottschall et al. | |
| 2014/0217012 A1 | 8/2014 | Wiesner et al. | |
| 2014/0363572 A1 | 12/2014 | Moll et al. | |
| 2014/0371698 A1 | 12/2014 | Chang et al. | |
| 2015/0151256 A1 | 6/2015 | Abetz et al. | |
| 2015/0343395 A1 | 12/2015 | Aamer et al. | |
| 2015/0343398 A1 | 12/2015 | Aamer et al. | |
| 2016/0023171 A1 | 1/2016 | Phillip et al. | |
| 2016/0229969 A1 | 8/2016 | Wiesner et al. | |
| 2016/0288062 A1 | 10/2016 | Ait-Haddou et al. | |
| 2016/0319158 A1 | 11/2016 | Fleury et al. | |
| 2016/0375409 A1 | 12/2016 | Stasiak et al. | |
| 2017/0022337 A1 | 1/2017 | Wiesner et al. | |
| 2017/0105877 A1 | 4/2017 | Buteux et al. | |
| 2017/0327649 A1 * | 11/2017 | Wiesner | B01D 67/0079 |
| 2018/0043314 A1 | 2/2018 | Onyemauwa et al. | |
| 2018/0043656 A1 | 2/2018 | Song et al. | |
| 2019/0233307 A1 | 8/2019 | Fujimura et al. | |
| 2020/0238227 A1 | 7/2020 | Dorin et al. | |
| 2020/0339770 A1 | 10/2020 | Wiesner et al. | |
| 2021/0040281 A1 | 2/2021 | Dorin et al. | |

FOREIGN PATENT DOCUMENTS

| | | |
|---|---|---|
| CN | 201211329 Y | 3/2009 |
| CN | 101460203 A | 6/2009 |
| CN | 101516481 A | 8/2009 |
| CN | 101969902 A | 2/2011 |
| CN | 102224163 A | 10/2011 |
| CN | 102892486 A | 1/2013 |
| CN | 103797053 A | 5/2014 |
| CN | 104159657 A | 11/2014 |
| CN | 104768506 A | 7/2015 |
| CN | 105273211 A | 1/2016 |
| CN | 105536580 A | 5/2016 |
| CN | 106344539 A | 1/2017 |
| DE | 102012207338 A1 | 11/2013 |
| DE | 102014213027 A1 | 1/2016 |
| EP | 2160946 A1 | 3/2010 |
| EP | 2703016 A1 | 3/2014 |
| EP | 2705077 A2 | 3/2014 |
| EP | 2977101 A1 | 1/2016 |
| EP | 3056260 A1 | 8/2016 |
| EP | 3284529 A1 | 2/2018 |
| EP | 3541500 A1 | 9/2019 |
| EP | 3544720 A1 | 10/2019 |
| EP | 3658262 A1 | 6/2020 |
| FR | 3037071 A1 | 12/2016 |

(56) References Cited

FOREIGN PATENT DOCUMENTS

| JP | 54-145766 A | 11/1979 |
|---|---|---|
| JP | 04-022428 A | 1/1992 |
| JP | 09-048861 A | 2/1997 |
| JP | 2002-537422 A | 11/2002 |
| JP | 2005-500132 A | 1/2005 |
| JP | 2006-175207 A | 7/2006 |
| JP | 2011-117956 A | 6/2011 |
| JP | 2011-131208 A | 7/2011 |
| JP | 2011-189229 A | 9/2011 |
| JP | 2012-246162 A | 12/2012 |
| JP | 2015-083299 A | 4/2015 |
| JP | 2015-167914 A | 9/2015 |
| JP | 2016-514049 A | 5/2016 |
| JP | 2016-526089 A | 9/2016 |
| JP | 2017-153616 A | 9/2017 |
| JP | 2018-500401 A | 1/2018 |
| JP | 2019-514687 A | 6/2019 |
| KR | 10-2009-0088124 A | 8/2009 |
| KR | 10-2012-0047269 A | 5/2012 |
| KR | 10-2012-0124412 A | 11/2012 |
| KR | 2012-0124412 A | 11/2012 |
| KR | 10-2016-0020404 A | 2/2016 |
| KR | 10-2018-0019059 A | 2/2018 |
| SG | 10201706492 | 3/2018 |
| SG | 11201904425 Y | 6/2019 |
| SG | 11202000664 Y | 2/2020 |
| WO | 2005/082501 A1 | 9/2005 |
| WO | 2005/091755 A2 | 10/2005 |
| WO | 2008/034487 A1 | 3/2008 |
| WO | 2010/051150 A1 | 5/2010 |
| WO | 2011/098851 A1 | 8/2011 |
| WO | 2011/111679 A1 | 9/2011 |
| WO | 2011/123033 A1 | 10/2011 |
| WO | 2012/151482 A2 | 11/2012 |
| WO | 2014/164793 A2 | 10/2014 |
| WO | 2015/048244 A1 | 4/2015 |
| WO | 2015/168409 A1 | 11/2015 |
| WO | 2015/188225 A1 | 12/2015 |
| WO | 2016/023765 A1 | 2/2016 |
| WO | 2016/031834 A1 | 3/2016 |
| WO | 2016/066661 A1 | 5/2016 |
| WO | 2017/189697 A1 | 11/2017 |
| WO | 2018/043209 A1 | 3/2018 |
| WO | 2018/055801 A1 | 3/2018 |
| WO | 2018/093714 A1 | 5/2018 |
| WO | 2018/097988 A1 | 5/2018 |
| WO | 2019/023135 A1 | 1/2019 |
| WO | 2019/178045 A1 | 9/2019 |
| WO | 2019/178077 A1 | 9/2019 |
| WO | 2019/195396 A1 | 10/2019 |

OTHER PUBLICATIONS

Phillip, et al., "Tuning Structure and Properties of Graded Triblock Terpolymer-Based Mesoporous and Hybrid Films." Nano Letters, vol. 11, No. 7, pp. 2892-2900, Jun. 7, 2011.
A Bruil et al., "The Mechanisms of Leukocyte Removal by Filtration." Transfusion Medicine Reviews vol. IX No. 2, pp. 145-166, Apr. 1995.
A. A. Shukla et al., "Recent Advances in Large-Scale Production of Monoclonal Antibodies and Related Proteins." Trends in Biotechnology, vol. 28, No. 5, pp. 253-261, 2010.
A.S. Devonshire et al., "Towards Standardisation of Cell-Free DNA Measurement in Plasma: Controls for Extraction Efficiency, Fragment Size Bias and Quantification." Anal. Bioanal. Chem., vol. 406, pp. 6499-6512, 2014.
Behler, Ansgar (Edited by), "Poren," Rompp Verlag, Rompp online 4.0, Aug. 2005, retrieved from Internet: URL: https://roempp.thieme.de/roempp4.0/do/data/RD-16-03734.
Breiner et al, "Structural Characterization of the "Knitting Pattern" in Polystyrene-block-poly(ethylene-co-butylene)-block-poly(methyl methacrylate) Triblock Copolymers", Macromolecules 1998, 31, 135-141.
Clodt et al., "Performance study of isoporous membranes with tailored pore sizes", Journal of Membrane Science, vol. 495, Jul. 29, 2015, pp. 334-340.
D. Keskin, et al., "Postmodification of PS-b-P4VP Diblock Copolymer Membranes by ARGET ATRP." Langmuir, vol. 30, pp. 8907-8914, Jun. 19, 2014.
Dai et al., "Fabrication of 2D ordered structure of self-assembled block copolymers containing gold nanoparticles," Journal of Crystal Growth, vol. 288, No. 1, pp. 128-136, Feb. 2, 2006.
Doan Minh Y Nhi, "Investigation of the Effects of UV-Crosslinking on Isoporous Membrane Stability." KTH Chemical Science and Engineering, pp. 1-46, 2011.
E. Gifford et al., "Sensitivity Control of Optical Fiber Biosensors Utilizing Turnaround Point Long Period Gratings with Self-Assembled Polymer Coatings." Proceedings of the SPIE, vol. 6659 pp. 66590D-1-66590D-9 Sep. 30, 2007.
F. A. Carey, Ornanic Chemistry, Fifth Edition, pp. 859-860, 2003.
Fink, Johannes Karl. Handbook of Engineering and Specialty Thermoplastics. 2011. vol. 2, Water Soluble Polymers. Chapter 7. p. 189-192. (Year: 2011).
H. Ahlbrecht et al., "Stereoselective synthesis." Methods of Organic Chemistry. Houben-Weyl, vol. E 21 a, 4th Edition Supplement, 1995.
H. Sai et al., "Hierarchical Porous Polymer Scaffolds from Block Copolymers." Science, vol. 341, pp. 530-533, Aug. 2, 2013.
Hanselmann, Blockcopolymere, ROMPP Online, Version 3.37, Dokumentkennung RD-02-02007. Jul. 1, 2009.
Hilke et al., "Block copolymer/homopolymer dual-layer hollow fiber membranes", Journal of Membrane Science, vol. 472, Aug. 23, 2014, pp. 39-44.
Hoek et al., Physical-chemical properties, separation performance, and fouling resistance of mixed-matrix ultrafiltration member, Desalination, Elsevier, vol. 283, pp. 89-99. May 4, 2011.
Huang Yan et al: "Highly Ordered Mesoporous Carbonaceous Frameworks from a Template of a Mixed Amphiphilic Triblock-Copolymer System of PEO-PPO-PEO and Reverse PPO-PEO-PPO", Chemistry—an Asian Journal, vol. 2, No. 10, Oct. 1, 2007 (Oct. 1, 2007), pp. 1282-1289.
J. I. Clodt et al., "Carbohydrates as Additives for the Formation of Isoporous PS-b-P4VP Diblock Copolymer Membranes." Macromolecular Rapid Communications, vol. 34, 190-194, 2013.
J. Suzuki et al., "Morphology of ABC Triblock Copolymer/Homopolymer Blend Systems." Journal of Polymer Science Part B: Polymer Physics vol. 40 pp. 1135-1141 Apr. 22, 2002.
Julie N.L. Albert et al. "Self-assembly of block copolymer thin films", Materialstoday, vol. 13, is. 6, Jun. 2010, pp. 24-33.
Jung et al., Structure Formation of Integral Asymmetric Composite Membranes of Polystyrene-block-Poly(2-vinylpuridine) on a Nonwoven, Macromolecular Materials and Engineering, vol. 297, No. 8, pp. 790-798. Feb. 9, 2012.
Kanegsberg, "Washing, Rinsing, and Drying: Items to Consider for the Optimization of Your Cleaning Process," https://www.materialstoday.com/metal-finishing/features/washing-rinsing-and-drying-items-to-consider-for/, Sep. 1, 2005. p. 2, paragraph 6.
Karunakaran et al. "IsoporousIPS-b-PEO ultrafiltration membranes via self-assembly and water-induced phase separatioIn" Journal of Membrane Science, vol. 453 Issue 1 (Nov. 16, 2013): pp. 471-477.
Khademi, M. Application of Tubular Crssflow Microfiltration in Harvesting Microalgae. LSU Master's Theses. 2014, pp. 39-43.
Kharitonov et al., "Surface modification of polymers by direct fluorination: A convenient approach to improve commercial properties of polymeric articles," Pure Appl. Chem., vol. 81, No. 3, pp. 451-471, 2009.
Laboratory-Equipment.com, "Applications for Laboratory Ovens Across the Sciences." https://www.laboratory-equipment.com/blog/all-laboratory-equipment-blogs/applications-for-laboratory-ovens-across-the-sciences/, Oct. 15, 2015, p. 1, section "Standard and Specialized Lab Oven Applications".
Lawrence E. Nielsen, "Cross-Linking-Effect on Physical Properties of Polymers." Journal of Marcomolecular Science Part C, vol. 3(1 ), pp. 69-103, 2008.
Li Yuk Mun et al: "Asymmetric Membranes from Two Chemically Distinct Triblock Terpolymers Blended during Standard Membrane

(56) References Cited

OTHER PUBLICATIONS

Fabrication", Macromolecular Rapid Communications, vol. 37, No. 20, Oct. 1, 2016 (Oct. 1, 2016), pp. 1689-1693.

Lubomir et al., "Deposition of polymeric perfluored thin films in proton ionic membranes by plasma processes," Applied Surface Science, vol. 254, pp. 173-176, 2007.

Mu X. et al., Nano-porous Nitrocellulose Liquid Bandage Modulates Cell and Cytokine Response and Accelerates Cutaneous Wound Healing in a Mouse Model. Carbohydr Polym., Sep. 25, 2015, vol. 136, pp. 618-629.

N. Lefevre et al., "Self-Assembly in Thin Films of Mixtures of Block Copolymers and Homopolymers Interacting by Hydrogen Bonds." Macromolecules, vol. 43, No. 18, pp. 7734-7743 Aug. 17, 2010.

Parul Jain et.al., "Protein purification with polymeric affinity membranes containing functionalized poly (acid) brushes", Biomacromolecules, 2010, vol. 11, No. 4, 1019-1026.

Peinemann et al, "Asymmetric superstructure formed in a block copolymer via phase separation", Nature Materials, V6, Dec. 2007 (Peinemann NLP).

Qiu et al. "Selective Separation of Similarly Sized Proteins with Tunable Nanoporous Block Copolymer Membranes." ACS Nano. vol. 7, No. 1, 2013. p. 768-776 (Year: 2013).

R. van Reis et al., "High Performance Tangential Flow Filtration." Biotechnology and Bioengineering, vol. 56, No. 1, pp. 71-82, Oct. 5, 1997.

Radjabian, Polymer, 55 (2014), 2986-2997 (Year: 2014).

Ren et al, J. Am. Chem. Soc, 1998, 120, 6830-6831 (Year: 1998).

Roland et al., "Supplementary Information Block Copolymer/ Homopolymer Dual-Layer Hollow Fiber Membranes Imaging and Characterization Lab and c Water Desalination", Aug. 23, 2014, pp. 1-3.

S. Breitbach et al., "Direct Quantification of Cell-Free, Circulating DNA from Unpurified Plasma." PLOS One, vol. 9, Issue 3, e87838. pp. 1-11.

S. P. Nunes et al., "From Micelle Supramolecular Assemblies in Selective Solvents to Isoporous Membranes." Langmuir, DOI 10.1021/la201439P, Jun. 28, 2011.

S. Rangou et al., "Self-Organized Isoporous Membranes with Tailored Pore Sizes." Journal of Membrane Science, vol. 451, pp. 266-275, 2014.

Shahkaramipour et al., "Membranes with Surface-Enhanced Antifouling Properties for Water Purification," Membranes, vol. 7, pp. 13, 2017.

Tiraferri et al., Binding Silver and Silica Nanoparticles to Polymeric Membrane Surfaces for Novel Anti-Biofouling Properties, ACS Division Proceedings, Division of Polymer Chemistry, Meeting 242, Aug. 28-Sep. 1, 2011, Denver, CO, USA. Sep. 1, 2011.

Volker Abetz "Isoporous Block Copolmer membranes", Macromolecular Rapid Communications, vol. 36, No. 1, Nov. 29, 2014 (Nov. 29, 2014), pp. 10-22.

Wang Zhaogen et al: "Isoporous membranes with gradient porosity by selective swelling of UV-crosslinked block copolymers", Journal of Membrane Science, vol. 476, Feb. 1, 2015 (Feb. 1, 2015), pp. 449-456.

Y Nhi et al., "Investigation of the Effect of UV-Crosslin King on Isoporous Membrane Stability", Chemical Science and Engineering, vol. 46, Dec. 12, 2011.

Yizhou Zhang et al: "Nanoporous membranes generated from self-assembled block polymer precursors: Quo Vadis?", Journal of Applied Polymer Science, vol. 132, No. 21, Jun. 5, 2015.

Yizhou Zhang, et al., "Microfiltration and Ultrafiltration Membrane Science and Technology". Journal of Applied Polymer Science, app. 41683, on. 1-17, 2015.

Young et al., Robert J., Introduction to Polymers, Third Edition, CRC Press 2011, pp. 6-9 and 456-457.

\* cited by examiner

ISOPOROUS MESOPOROUS ASYMMETRIC BLOCK COPOLYMER MATERIALS WITH MACROVOIDS AND METHOD OF MAKING THE SAME

CROSS REFERENCE TO RELATED APPLICATION

This application is a national stage of International Patent Application No. PCT/US2019/021780 filed Mar. 12, 2019, which claims the benefit of U.S. Provisional Application No. 62/641,637 filed Mar. 12, 2018, the entire contents of which are incorporated by reference herein.

FIELD OF THE INVENTION

Embodiments relate to diblock or multiblock copolymer based isoporous mesoporous asymmetric materials comprising macrovoids.

BACKGROUND OF THE INVENTION

Mesoporous isoporous block copolymer materials are known and are useful due to their small, uniform pores. Combining an asymmetric structure with the mesoporous isoporous structure makes the materials very useful for high resolution, high flux separations wherein the mesoporous isoporous "skin" enables high resolution separations and the asymmetric structure enables high flux. The manufacturing of these materials, however, often results in macrovoids that are deemed undesirable. It is widely taught that macrovoids in membranes are undesirable as they cause mechanical weakness and can breach the skin causing defects.

Abetz 2014a and Abetz 2015 teach about self-assembled diblock copolymer membranes made with solvent mixtures primarily based on tetrahydrofuran (THF) and dimethylformamide (DMF) at different ratios with various poly(styrene-block-4-vinylpyridine) polymers at multiple concentration (19 to 35 wt %) and short evaporation windows (5-10 s). No macrovoids are shown in the materials' structures in the library of conditions explored. Abetz 2014b also characterizes the adsorption of lysozyme protein near its isoelectric point (11.4). However, these membranes demonstrate more than 120 μg/cm$^2$ in lysozyme adsorption and it teaches that the lysozyme adsorption is independent of the membrane pore size and polymer used for the membrane formation.

Besides the well-known typically DMF/THF solvent composition, diblock copolymer membranes from solvents combination of: 1,4-dioxane (DOX)/THF, DOX/DMF, DOX/THF/DMF are also taught in Abetz 2012, Abetz 2014b, Abetz 2015, Abetz 2017, Peinemann 2010, Peinemann 2011, and Peinemann 2014a.

A method of forming isoporous membranes with a sponge-like structure based on self-assembly of block copolymers is described by Peinemann & Abetz 2007 (also see '694 application'). However, none of the structures include macrovoids. Additionally, in Peinemann & Nunes 2012, it is taught in paragraph [0011] that "The method (694 application) has been difficult to reproduce. When the procedure described in the '694 application is applied to commercially available purified block copolymers it does not lead to isoporous membranes." Peinemann & Nunes 2012 also does not include the macrovoid structural feature. While the 694 application states that "Optionally, the casting solution can also contain one or more nonsolvents for the block copolymer in addition to a solvent" no mention of expected outcome is discussed.

Peinemann 2014b teaches a DMF/DOX/Acetone (24 wt %/42 wt %/16 wt %) solvent composition to make diblock copolymer membranes. However, the membranes made from this solution do not comprise macrovoids or a transition layer.

| Table of Related Art | |
|---|---|
| Abetz 2014a | Self-organized isoporous membranes with tailored pore sizes, *Journal of Membrane Science*, 451, 2014 266-275 |
| Abetz 2015 | Performance Study of Isoporous membranes with tailored pore sizes, *Journal of Membrane Science*, 495, 2015, 334-340 |
| Abetz 2014b | Protein separation performance of self-assembled block copolymer membranes, *RSC Advances*, 2014, 4, 10252-10260 |
| Peinemann 2010 | Ultraporous Films with Uniform Nanochannels by Block Copolymer Micelles Assembly, *Macromolecules*, 43, 2010, 8079-8085 |
| Peinemann 2011 | From Micelle Supramolecular Assemblies in Selective Solvents to Isoporous Membranes. *Langmuir* 2011, 27, 10184-10190 |
| Peinemann 2014a | Time-Resolved GISAXS and Cryo-Microscopy Characterization of Block Copolymer Membrane Formation. *Polymer* 2014, 55, 1327-1332 |
| Abetz 2012 | Structure Formation of Integral Asymmetric Composite Membranes of Polystyrene-block-Poly(2-vinylpyridine) on a Nonwoven, *Macromolecular Materials and Engineering*, 2012, 297, 790-798 |
| Abetz 2017 | Influence of Solvent on the Structure of an Amphiphilic Block Copolymer in Solution and in Formation of an Integral Asymmetric Membrane, *ACS Applied Materials & Interfaces*, 9, 37, 2017 31224-31234 |
| Peinemann & Abetz 2007 | Asymmetric superstructure formed in a block copolymer via phase separation, *Nature Materials* 6, 2007, 992-996 |
| Peinemann & Abetz 2009, or 694 application | US2009/0173694A1 |
| Peinemann & Nunes 2012 | US2012/0318741A1 |
| Peinemann 2014b | Block Copolymer/Homopolymer Dual-Layer Hollow Fiber Membranes, *Journal of Membrane Science*, 427, 2014, 39-44 |

BRIEF DESCRIPTION OF DRAWINGS

FIG. 1a, 1c, 1e: materials made from SV168 in 1,4-oxane/acetone (80/20 wt % solvent composition) polymer solution. FIGS. 1b, 1d, 1f: materials made from SV168 in 1,4-dioxane/acetone (6040%% solvent composition) polymer solution. FIGS. 1a, 1b: isoporous mesoporous materials; FIGS. 1c, 1d: cross-sectional structures near the isoporous mesoporous skin; FIGS. 1e, 1f: overall cross-sectional structures.

FIGS. 2a and 2d show a film where: SV168 is dissolved in 10 wt % polymer concentration in DOX/ACE (70 wt %/30 wt % solvent composition) 60 s evaporation time; FIGS. 2b and 2e show a film where SV221 is dissolved in 10 wt % polymer concentration in DOX/ACE (60 wt %/40 wt %, solvent composition) 45 s evaporation time, FIGS. 2c and 2f show a film where: SV273 is dissolved in 10 wt % polymer concentration in DOX/ACE (60 wt %/40 wt % solvent composition), 45 s evaporation time. FIGS. 2a, 2b, 2c: isoporous mesoporous skin; FIGS. 2d, 2e, 2f: cross-sectional structures near the isoporous mesoporous skin.

FIGS. 3a and 3c show a film where: SV168 is cast from 17 wt % polymer concentration in DMF/THF/DOX (33.3 wt %/33.3 wt %/33.3 wt % solution composition) and evaporated for 40 s. FIGS. 3b and 3d show a film where: SV168 is cast from 19 wt % polymer concentration in DMF/THF (40 wt % 60 wt % solution composition) and evaporated for 20 s. FIGS. 3a and 3b skin layer; FIGS. 3c and 3d: overall cross-sectional structures.

DETAILED DESCRIPTION OF THE INVENTION

Figure 1:
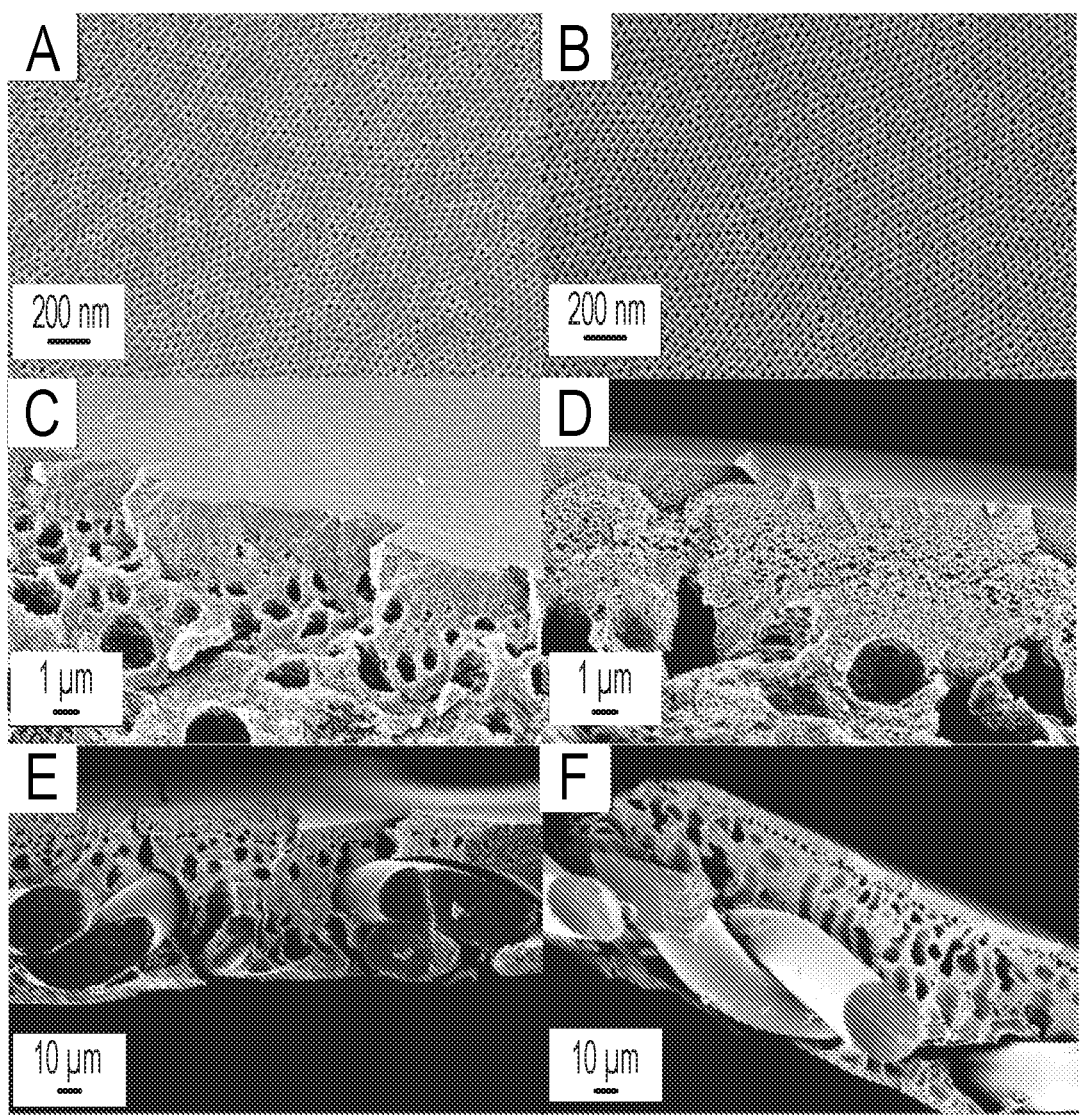
FIG. 1 is scanning electron microscopy (SEM) images of disclosed materials of Example 1.

The following description of the embodiments is merely exemplary in nature and is in no way intended to limit the subject matter of the present disclosure, their application, or uses.

As used throughout, ranges are used as shorthand for describing each and every value that is within the range. Any value within the range can be selected as the terminus of the range.

For the purposes of this specification and appended claims, unless otherwise indicated, all numbers expressing quantities, percentages or proportions, and other numerical values used in the specification and claims, are to be understood as being modified in all instances by the term "about." The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The present disclosure relates to an isoporous mesoporous block copolymer asymmetric material comprising a transition layer and further comprising macrovoids. Embodiments disclosed herein also relate to methods of producing said materials. The disclosed materials show remarkably low protein adsorption and integrate with porous supports. Comparable materials lacking both macrovoids and a transition layer show much higher protein adsorption and do not integrate with porous supports, both of which are undesirable.

In the context of the disclosure, isoporous means having a substantially narrow pore diameter distribution. For example, a narrow pore size distribution. In the context of the disclosure, mesoporous means the pore diameters ranges from 1 nm to 200 nm. One surface of the material disclosed comprises isoporous mesopores, which is the selective layer, or "skin". In the context of the disclosure, macroporous or macropore means that at least two pore dimensions are greater than 1 micron. In the context of the disclosure, freestanding means not integrally joined with a porous support material.

In some embodiments, the materials comprise at least one diblock copolymer or multiblock copolymer, having a structure in the form of A-B, B-A, B-A-B, A-B-A-B, B-A-B-A, or A-B-A, wherein A and B represent two distinct types of block chemistries. In a preferable embodiment, A is a hydrophilic and/or hydrogen-bonding block and B is a hydrophobic block. Suitable hydrogen-bonding and/or hydrophilic blocks include, but are not limited to, polyvinylpyridines, polyethylene oxides, polyacrylic acids, poly(hydroxystyrene), polvacrylates and polymethacrylates, substituted polyacrylates and polymethacrylates. More specific examples of hydrophilic blocks include: poly(acrylic acid), poly(acrylamide), poly(vinylpyridine), poly(vinylpyrrolidone), poly(vinyl alcohol), naturally derived polymers such as cellulose and chitosan, poly(ether), poly(maleic anhydride), poly(N-isopropylacrylamide), poly(styrene sulfonate), poly(allylhydrochloride), poly(sulfone), poly(ethersulfone), poly(ethylene glycol), poly(2-hydroxyethyl methacrylate). More specific examples of hydrogen-bonding blocks include: poly(vinylpyridine), poly(ethylene oxide), poly(methacrylate), poly(methyl methacrylate), poly(dimethylethyl amino ethyl methacrylate), poly(dimethylaminoethyl methacrylate) poly(acrylic acid), poly(hydroxystyrene), poly(dimethylacrylamide). Suitable hydrophobic blocks can include, but are not limited to, polystyrenes, e.g., polystyrene and poly(alkyl substituted styrene) such as poly(alpha-methyl styrene), polypropylenes, poly(vinyl chlorides), polybutadiene, poly(isoprene), poly(ethylene-stat-butylene), poly(ethylene-alt-propylene), and polytetrafluoroethylenes. Furthermore, substituted analogues of the above are suitable.

The materials' cross-sectional structures are asymmetric, wherein the average pore size increases as the distance from the skin increases. More specifically, in some embodiments the skin of the material comprises mesoporous isopores, and as the distance from this layer increases, the average pore size increases. The pore density can be in the range of at least $10^{13}$ pores/m$^2$ to at least $10^{14}$ pores/m$^2$.

Macrovoids, or macropores, are pores with at least one characteristic length substantially larger than the typical size of the surrounding pores. For the purpose of describing the disclosed invention, we define a macrovoid or macropore as a void with at least one characteristic length greater than about 0.5 micron. Typical shapes of macrovoids can be, but are not limited to, the following:
  a. Spherical: approximately spheroidal void structures with approximate diameter of at least about 0.5 micron.
  b. Tear-like: void structures with at least two distinctly different characteristic lengths and at least two characteristic lengths greater than 0.5 micron. These void structures include, but are not limited to structures resembling a tear drop, pear-like or piriform shapes, and bell-like shapes.
  c. Finger-like: void structures with at least two dimensions greater than 0.5 micron and an aspect ratio greater than 3.

The isoporous mesoporous materials also comprise a transition layer with a thickness of at least about 300 nm wherein there is a low macrovoid density and one surface comprises the mesoporous isoporous "skin". A low macrovoid density means a ratio of macrovoids to mesopores of at most $2\times10^{-9}$ For example, for a typical mesoporous isoporous diblock material skin pore density of $10^{14}$ pores/m$^2$, this correlates to $2\times10^5$ macrovoids/m$^2$. This transition layer extends onto an adjacent sub-structure with a thickness of about 1 micron to about 500 microns. The macrovoids are present at high density in the sub-structure layer compared to the transition layer. A high macrovoid density means at least $10^6$ macrovoids/m$^2$. This high macrovoid density is significantly higher than the low macrovoid density of the transition layer. With a low macrovoid density within at least about 300 nm of the skin, it will reduce the fracturing resulting from the macrovoids, and enhance the overall mechanical integrity. Furthermore, the distance from the mesoporous isoporous skin can mitigate top surface defects caused by macrovoids intersecting the skin and can prevent any skin defects from propagating into the sub-structures.

In at least one embodiment, the transition layer is at least about 300 nm. In at least one embodiment, the transition layer is at least about 350 nm. In at least one embodiment, the transition layer is at least about 400 nm. In at least one embodiment, the transition layer is at least about 450 nm. In at least one embodiment, the transition layer is at least about 500 nm.

In some embodiments of the material, the mesopores are in the range of about 1 nm to about 200 nm. In some embodiments, the mesopores are in the range of about 5 nm to about 200 nm. In some embodiments, the mesopores are in the range of about 5 nm to about 100 nm. In some embodiments, the mesopores are in the range of about 5 nm to about 50 nm.

In some applications, macrovoids may also be desired to reduce the amount of polymer needed for the material, making large-scale synthesis more practical while using less starting materials. In some embodiments, the mesoporous isoporous material is freestanding and has a dried density of less than about 0.26 g/cm$^3$. In some embodiments, the mesoporous isoporous material is freestanding and has a dried density of less than about 0.22 g/cm$^3$. In some embodiments, the mesoporous isoporous material is freestanding and has a dried density of less than about 0.20 g/cm$^3$. In some embodiments, the mesoporous isoporous material is freestanding and has a dried density of less than about 0.18 g/cm$^3$. In some embodiments, the mesoporous isoporous material is freestanding and has a dried density of less than about 0.10 g/cm$^3$. Area and mass measurements of the material can be measured on dried material and drying can be performed by heating in an oven at 65° C. for 48 h.

In some instances, a material in accordance with the present disclosure can be produced by a method comprising the following steps:
  1. Dissolving at least one diblock or multiblock copolymer in a solution, the solution comprising at least one solvent and at least one nonsolvent to form a polymer solution;
  2. Dispensing the polymer solution onto a substrate or mold, or through a die or template;
  3. Removing at least a portion of solvent and/or nonsolvent from the polymer solution for at least 20 seconds to form a concentrated polymer solution;
  4. Exposing the concentrated polymer solution to a nonsolvent causing precipitation of at least a portion of the dissolved polymer from the concentrated polymer solution; and
  5. Optionally, washing the precipitated polymer product.

In some instances, a material in accordance with the present disclosure can be produced by a method comprising the following steps:
  1. Dissolving at least one diblock or multiblock copolymer in a solution, the solution comprising at least 33% by weight of one solvent or a combination of solvents and at least 18% by weight of one nonsolvent or a combination of nonsolvents, to form a polymer solution;
  2. Dispensing the polymer solution onto a substrate or mold, or through a die or template;
  3. Removing at least a portion of solvent and/or nonsolvent from the polymer solution to form a concentrated polymer solution;
  4. Exposing the concentrated polymer solution to a nonsolvent causing precipitation of at least a portion of the dissolved polymer from the concentrated polymer solution; and
  5. Optionally, washing the precipitated polymer product.

In some instances, a mesoporous isoporous asymmetric material comprising macrovoids and a transition layer can be produced by a method comprising the following steps:

1. Dissolving at least one diblock or multiblock copolymer in a solution, the solution comprising at least 33% by weight of one solvent or a combination of solvents and at least 18% by weight of one nonsolvent or a combination of nonsolvents, to form a polymer solution;
2. Dispensing the polymer solution onto a substrate or mold, or through a die or template;
3. Removing at least a portion of solvent and/or nonsolvent from the polymer solution to form a concentrated polymer solution;
4. Exposing the concentrated polymer solution to a nonsolvent causing precipitation of at least a portion of the polymer from the concentrated polymer solution; and
5. Optionally, washing the precipitated polymer product.

In some instances, a mesoporous isoporous asymmetric material comprising macrovoids and a transition layer can be produced by a method comprising the following steps:
1. Dissolving at least one diblock or multiblock copolymer in a solution, the solution comprising at least one solvent and at least one nonsolvent with a polymer concentration of at most 16% by weight, to form a polymer solution;
2. Dispensing the polymer solution onto a substrate or mold, or through a die or template;
3. Removing at least a portion of solvent and/or nonsolvent from the polymer solution to form a concentrated polymer solution;
4. Exposing the concentrated polymer solution to a nonsolvent causing precipitation of at least a portion of the dissolved polymer from the concentrated polymer solution; and
5. Optionally, washing the precipitated polymer product.

In some instances, a material in accordance with the present disclosure can be produced by a method comprising the following steps:
1. Dissolving at least one diblock or multiblock copolymer in a solution, the solution comprising at least one solvent and at least one nonsolvent with a polymer concentration of at most 16% by weight, to form a polymer solution;
2. Dispensing the polymer solution onto a substrate or mold, or through a die or template;
3. Removing at least a portion of solvent and/or nonsolvent from the polymer solution to form a concentrated polymer solution;
4. Exposing the concentrated polymer solution to a nonsolvent causing precipitation of at least a portion of the dissolved polymer from the concentrated polymer solution; and
5. Optionally, washing the precipitated polymer product.

In some instances, a mesoporous isoporous asymmetric material comprising macrovoids and a transition layer can be produced by a method comprising the following steps:
1. Dissolving at least one diblock or multiblock copolymer in a solution, the solution comprising at least one solvent and at least one nonsolvent, to form a polymer solution;
2. Dispensing the polymer solution onto a substrate or mold, or through a die or template;
3. Removing at least a portion of solvent and/or nonsolvent from the polymer solution for at least 20 seconds to form a concentrated polymer solution;
4. Exposing the concentrated polymer solution to a nonsolvent causing precipitation of at least a portion of the polymer from the concentrated polymer solution; and
5. Optionally, washing the precipitated polymer product.

In some embodiments, the concentration of polymer in the polymer solution is from about 3 to 16% by weight. In at least one embodiment, the concentration of polymer in the polymer solution is from about 5 to about 16% by weight. In at least one embodiment, the concentration of polymer in the polymer solution is from about 10 to about 16% by weight. In at least one embodiment, the concentration of polymer in the polymer solution is from about 8 to about 16% by weight. In at least one embodiment of the above materials or methods, at least one diblock copolymer or multiblock copolymer is dissolved in step 1 of one of the above embodiments. In at least one embodiment, more than one diblock or multiblock copolymer is included in the polymer solution and/or material.

In some embodiments, at least a portion of the solvent(s) and/or nonsolvent(s) are removed from the polymer solution for at least about 20 seconds. In at least one embodiment, at least a portion of the solvent(s) and/or nonsolvent(s) are removed from the polymer solution for at least about 25 seconds. In at least one embodiment, at least a portion of the solvent(s) and/or nonsolvent(s) are removed from the polymer solution for at least about 30 seconds. In at least one embodiment, at least a portion of the solvent(s) and/or nonsolvent(s) are removed from the polymer solution for at least about 35 seconds. In at least one embodiment, at least a portion of the solvent(s) and/or nonsolvent(s) are removed from the polymer solution for at least about 40 seconds. In at least one embodiment, at least a portion of the solvent(s) and/or nonsolvent(s) are removed for at least about 45 seconds. In at least one embodiment, at least a portion of the solvent(s) and/or nonsolvent(s) are removed from the polymer solution for at least about 50 seconds. In at least one embodiment, at least a portion of the solvent(s) and/or nonsolvent(s) are removed from the polymer solution for at least about 55 seconds. In at least one embodiment, at least a portion of the solvent(s) and/or nonsolvent(s) are removed from the polymer solution for at least about 60 seconds. In at least one embodiment, at least a portion of the solvent(s) and/or nonsolvent(s) are removed from the polymer solution for at least about 65 seconds. In some embodiments, the solvent(s) and/or nonsolvent(s) are removed from the polymer solution for example, by an evaporation process. In some instances, the evaporation process can be performed under ambient pressure (1 atm). In some instances, the evaporation process can be performed under reduced pressure. In some instances, the evaporation process can be performed in an inert atmosphere such as nitrogen or argon.

In some embodiments, a polymer solution in accordance with the present disclosure comprises at least one solvent for the block copolymer or block copolymers, and at least one nonsolvent for the block copolymer or block copolymers. Any solvents and/or nonsolvents in the polymer solution should be miscible with each other. The designation of solubility or insolubility of a block copolymer or block in a given chemical or mixture of chemicals depends on the polymer chemistry and/or composition. In some embodiments, at least one solvent is an ether such as 1,4-dioxane or tetrahydrofuran. In some embodiments, at least one nonsolvent is one of the following classes: ketone, ester, alcohol, sulfoxide, sulfone. Some examples of nonsolvents include: acetone, methyl ethyl ketone, methyl isobutyl ketone, methyl amyl ketone, dimethyl ketone, cyclohexanone, propanone, ethyl acetate, propyl acetate, ethanol, isopropanol, benzyl alcohol, butanol, dimethylsulfoxide, and sulfolane.

In some embodiments, a polymer solution in accordance with the present disclosure comprises at least about 33% of one solvent or a combination of solvents and at least about 18% by weight of one nonsolvent or a combination of nonsolvents. In some embodiments of the materials or methods, the polymer solution comprises at least 33% of one solvent or a combination of solvents and about 18% to about 64% by weight of one nonsolvent or a combination of nonsolvents. In some embodiments, a polymer solution in accordance with the present disclosure comprises about 33% to about 79% of one solvent or a combination of solvents and about 18% by weight of one nonsolvent or a combination of nonsolvents. In some embodiments, a polymer solution in accordance with the present disclosure comprises at least about 50% of one solvent or a combination of solvents and at least about 20% by weight of one nonsolvent or a combination of nonsolvents. In some embodiments, a polymer solution in accordance with the present disclosure comprises at least about 50% of one solvent or a combination of solvents and at least about 18% by weight of one nonsolvent or a combination of nonsolvents.

The solvent/nonsolvent percentages totaling 100% can be called "solution composition" and are by weight and include only the solvents'/nonsolvents' weight (that is, the prior to addition of the polymer to the solution to form the polymer solution). In some embodiments, a solution composition in accordance with the present disclosure comprises about 60% of one solvent or a combination of solvents and about 40% by weight of one nonsolvent or a combination of nonsolvents. In some embodiments, a solution composition in accordance with the present disclosure comprises about 70% of a solvent or a combination of solvents and about 30% by weight of one nonsolvent or a combination of nonsolvents. In some embodiments, a solution composition in accordance with the present disclosure comprises about 80% of one solvent or a combination of solvents and about 20% by weight of a nonsolvent or a combination of nonsolvents. In some embodiments of the above methods and materials, at least one diblock copolymer or multiblock copolymer is dissolved in step 1 of one of the above embodiments. In some embodiments of the above methods and materials, the polymer solution or material comprises more than one diblock or multiblock copolymer.

The radius of curvature to fracture can be measured on freestanding materials in the wet state. More specifically, to measure the radius of curvature to fracture, the wet material is curved around a steel rod or other comparable rod or tube of known diameter, forming a "C" shape around the rod. The material is then uncurled and observed for macroscopic cracking along the fold. This test may be performed with the skin facing either towards or away from the rod. The contact length of the material to the rod is approximately 1 cm. In at least one embodiment, a material in accordance with various aspects of the present disclosure can be folded and unfolded according to the above procedure around a rod of diameter down to about 0.020 inches without cracking. In at least one embodiment, a material in accordance with various aspects of the present disclosure can be folded and unfolded according to the above procedure around a rod of diameter down to about 0.028 inches without cracking. In at least one embodiment, a material in accordance with various aspects of the present disclosure can be folded and unfolded according to the above procedure around a rod of diameter down to about 0.030" without cracking. In at least one embodiment, a material in accordance with various aspects of the present disclosure can be folded and unfolded according to the above procedure around a rod of diameter down to about 0.032 inches without cracking. In at least one embodiment, a material in accordance with various aspects of the present disclosure can be folded and unfolded according to the above procedure around a rod of diameter down to about 0.035 inches without cracking. In at least one embodiment, a material in accordance with various aspects of the present disclosure can be folded and unfolded according to the above procedure around a rod of diameter down to about 0.05 inches without cracking. In at least one embodiment, a material in accordance with various aspects of the present disclosure can be folded and unfolded according to the above procedure around a rod of diameter down to about 0.1 inches without cracking.

In some instances, isoporous mesoporous materials in accordance with various aspects of the present disclosure are freestanding. In some instances, isoporous mesoporous materials in accordance with various aspects of the present disclosure also comprise a porous support or are placed on a porous support. In some instances, isoporous mesoporous materials in accordance with various aspects of the present disclosure also comprise multiple porous supports or are placed on multiple porous supports or some combination of the above. The porous support material(s) may act as a mechanical substrate and provide additional mechanical properties such as stability or biocompatibility or other additional functionalities. The porous support material(s) can include various materials or physical properties for the various layers, thicknesses of the various layers, as well as variations in the pore size and structures. Suitable materials could include knitted, woven, or nonwoven materials, such as gauze, cotton, cellulose-based fabrics, rayon, polyesters, polyethylenes, graphene, graphene oxide, carbon foams, open cell foams such as polyurethane base, polystyrene, rayon, metal, metal oxide, or semiconductor mesh-like support structures. It may be desirable to integrate the mesoporous isoporous materials with aforementioned porous supports. For example, one or more mesoporous isoporous materials may be integrated with one or more porous support materials, preventing delamination or breakage of the material, whereas comparable mesoporous isoporous materials without a transition layer delaminate and break easily. While it is acknowledged that different modes of action are at work within the scope of the invention, in many embodiments, a mechanism of integration of the materials with porous supports is that the macrovoids mitigate stresses at the interface of the porous support, preventing delamination and cracking.

In some embodiments, at least one of said copolymers comprises an A block and a B block, wherein the A block is hydrophilic and/or hydrogen bonding and the B block is hydrophobic. In some embodiments, the block structure is a combination of A and B blocks, for example, A-B, B-A, B-A-B, A-B-A, B-A-B-A, A-B-A-B, etc. In at least one embodiment, at least one copolymer comprises an A block and a B block, wherein the A block is hydrophilic and/or hydrogen bonding and the B block is hydrophobic and the A block is a poly(vinylpyridine). In a least one embodiment, at least one copolymer comprises an A block and a B block, wherein the A block is hydrophilic and/or hydrogen bonding and the B block is hydrophobic and the A block is a poly(vinylpyridine) and the B block is poly(styrene). In at least one embodiment, at least one copolymer comprises an A block and a B block, wherein the A block is hydrophilic and/or hydrogen bonding and the B block is hydrophobic and the A block is poly(4-vinylpyridine) and the B block is poly(styrene). In at least one embodiment, at least one copolymer comprises an A block and a B block, wherein the A block is hydrophilic and/or hydrogen bonding and the B block is hydrophobic and the A block is poly(2-vinylpyridine) and the B block is poly(styrene). In at least one embodiment, at least one copolymer comprises an A block and a B block, wherein the A block is hydrophilic and/or hydrogen bonding and the B block is and the B block is a modified/or substituted poly(styrene), such as poly(hydroxystyrene) or poly(tert-butylstyrene). In at least one embodiment, at least one copolymer comprises an A block and a B block, wherein the A block is hydrophilic and/or hydrogen bonding and the B block is hydrophobic and the A block is poly(ethylene oxide). Further embodiments are conceivable from suitable blocks listed throughout this disclosure.

If the materials are to be used in biological-related applications, it is desirable to have low protein fouling properties. A typical method to measure the protein adsorption of a membrane material is by exposing the membrane to a protein solution with the pH near the protein isoelectric point (IEP). The overall charges of the proteins are neutral at around the IEP, so electrostatic interactions between the protein and membrane can be excluded in the measurement. In the context of the disclosure, "low protein fouling" is defined as adsorbing less than 100 µg/cm$^2$ lysozyme (Lys) and/or less than 375 µg/cm$^2$ immunoglobulin G (IgG), as measured using the procedure below. In some embodiments, the mesoporous isoporous materials are low protein fouling materials. In at least one embodiment, the low protein fouling mesoporous isoporous materials according to the present disclosure have a Lys adsorption of less than about 80 µg/cm$^2$. In at least one embodiment, the low protein fouling mesoporous isoporous materials according to the present disclosure have an IgG adsorption of less than about 300 µg/cm$^2$. In at least one embodiment, the low protein fouling mesoporous isoporous materials according to the present disclosure have a Lys adsorption of less than about 70 µg/cm$^2$. In at least one embodiment, the low protein fouling mesoporous isoporous materials according to the present disclosure have an IgG adsorption of less than about 200 µg/cm$^2$.

A procedure for determining if a material is low protein fouling is as follows: Lys (Lysozyme, IEP around 11.4, Lysozyme from chicken egg white, lyophilized powder, protein ≥90%, ≥40,000 units/mg protein, Sigma-Aldrich) and IgG (Immunoglobulin G, IEP around 7.4 γ-Globulins from bovine blood, ≥99% (agarose gel electrophoresis), Sigma-Aldrich) are prepared at 1.0 mg/mL concentration in phosphate-buffered saline (Phosphate Buffered Saline (PBS), 1×, PH=7.4, Quality Biological, VWR) at room temperature with pH around the IEP of the proteins (pH was adjusted by slowly adding sodium hydroxide for Lys). 4 mL of a given protein solution is placed on each material with 4.9 cm$^2$ area in a small closed dish. A separate 4 mL of a given protein solution is placed in a small closed dish without material ("control"). The dishes are shaken at 80 rpm for 16 hours at 23° C. The materials are soaked with 4 mL of the aforementioned PBS buffer solution for 20 min. The dish contains the original protein solution is marked "Ads", and the rinsed solution is marked "Wash". The protein concentration is measured by UV-Vis at 280 nm and a standard curve for each protein solution is used to correlate the UV-Vis adsorption and the protein concentration. The protein adsorption on the materials can be calculated as follows: Protein adsorption=m$_{(ads,protein)}$/material area= (["Control" concentration g/mL]−["Ads" concentration g/mL]−["Wash" Concentration g/mL])*(4.0 mL)/4.9 cm$^2$.

The testing procedure may be scaled according to material area if the aforementioned dimension is not appropriate (e.g. not enough area is available to use 4.9 cm$^2$). The adsorption test is performed on different swatches of material, one for each protein measured.

The material may be used as separation media, wherein a solute is separated from a liquid. For example, the material may be used as a membrane for separating solutes by a filtration mechanism.

EXAMPLES OF PREFERRED EMBODIMENTS

The block copolymers poly(styrene-block-4-vinylpyridine) (SV), are synthesized by anionic polymerization with the polymer characteristics in Table 1 below:

TABLE 1

| Polymer Characteristics | | | |
|---|---|---|---|
| | Overall molecular weight Mn (g/mol) | PS Mn (g/mol) | P4VP Mn (g/mol) | P4VP wt % |
| SV142 | 141.6k | 115.5k | 26.1k | 13% |
| SV168 | 168.4k | 133k | 35.4k | 21% |
| SV221 | 220.8k | 189.9k | 30.9k | 14% |
| SV273 | 272.8k | 237.3k | 35.5k | 13% |

Example 1

Example of the Disclosure. The polymer SV168 is dissolved at 10 wt % polymer concentration in 1,4-dioxane (DOX)/acetone (ACE) (80 wt %/20 wt % solution composition) and DOX/ACE (60 wt %/40 wt % solution composition) to provide a polymer solution. The polymer solutions are spread on a porous PET woven support with thickness about 60 µm, on top of a glass slide. The films are evaporated for 45 seconds at room temperature and the films are immersed in a water bath. The membrane precipitates in water. The membrane's isoporous mesoporous structures (FIGS. 1a and 1b), cross-sectional structures near the isoporous mesoporous structures (FIGS. 1c and 1d) overall structures (FIGS. 1e and 1f) are shown in FIG. 1.

Figure 2:
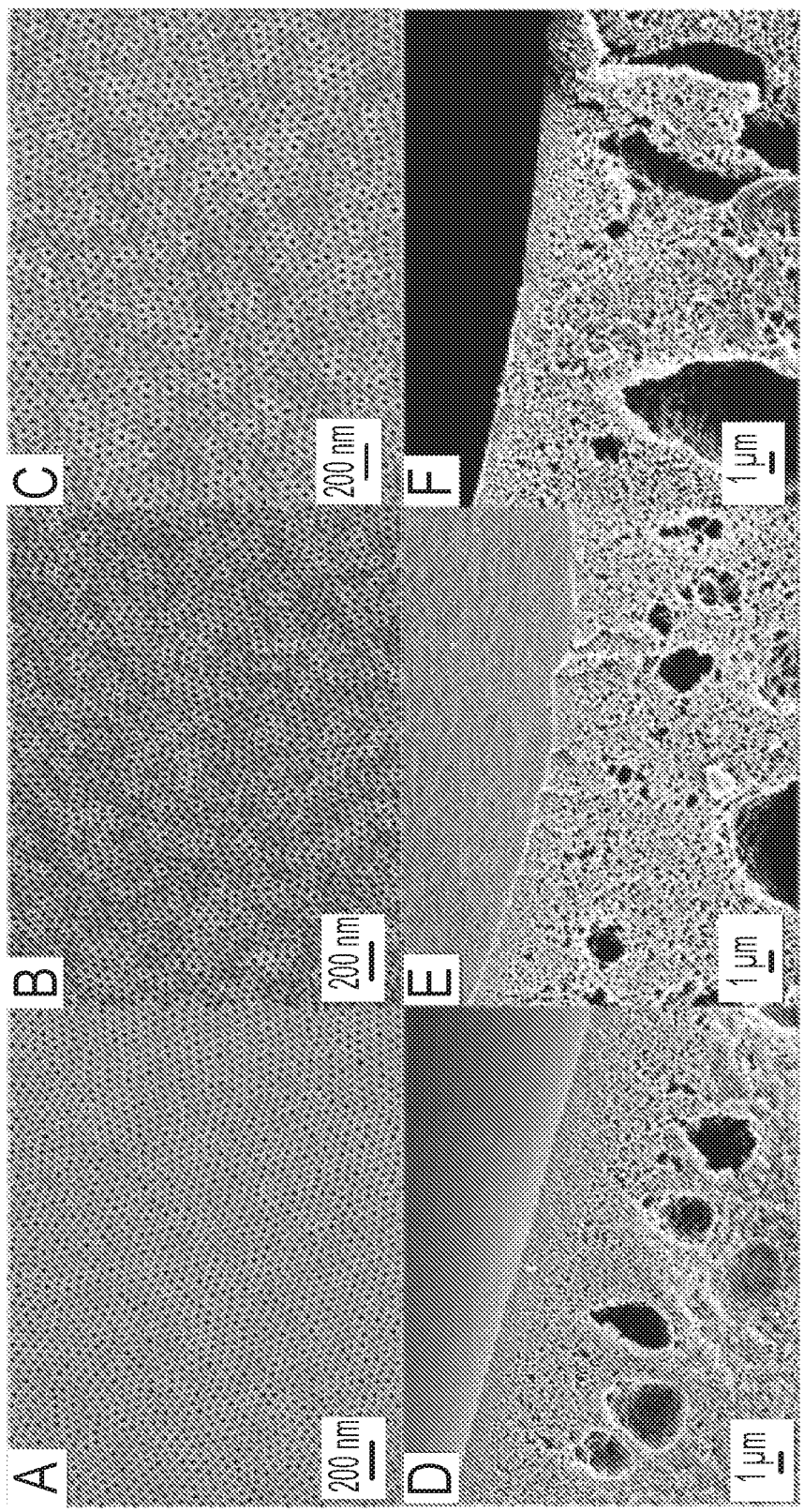
FIG. 2 is scanning electron microscopy (SEM) images of disclosed materials of Example 1.

SV168 is dissolved at 10 wt % polymer concentration in DOX/ACE (70 wt %/30 wt % solution composition), SV221 is dissolved at 10 wt % polymer concentration in DOX/ACE (60 wt %/40 wt % solution composition), SV273 is dissolved at 10 wt % polymer concentration in DOX/ACE (60 wt %/40 wt % solution composition). The polymer solutions are spread on a glass plate with gate height about 260 µm, on top of the glass slide, there is a PET woven support with thickness of about 60 µm. The films are evaporated for 60, 45 and 45 seconds, respectively at room temperature and the films are immersed in a water bath. The membranes precipitate in water. The isoporous mesoporous structures (FIGS. 2a, 2b, 2c) and cross-sectional structures near the isoporous mesoporous surface (FIGS. 2d, 2e, 2f) are shown in FIG. 2.

Comparative Example

Figure 3:
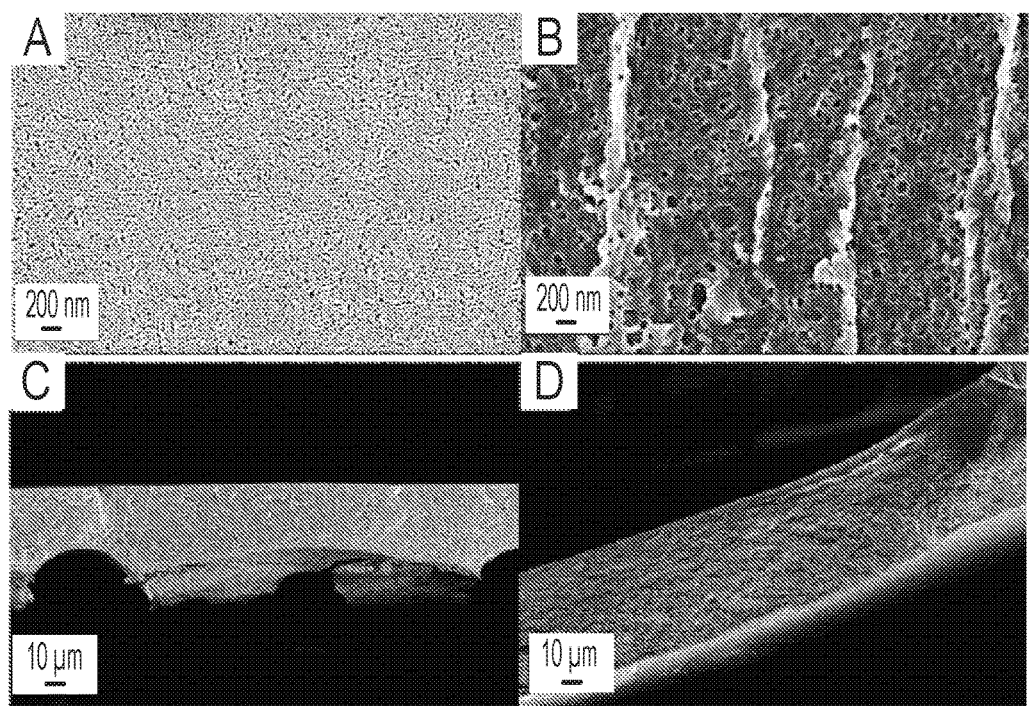
FIG. 3 is scanning electron microscopy (SEM) images of comparative examples of Example 1, lacking both macrovoids and a transition layer.
Figure 4:
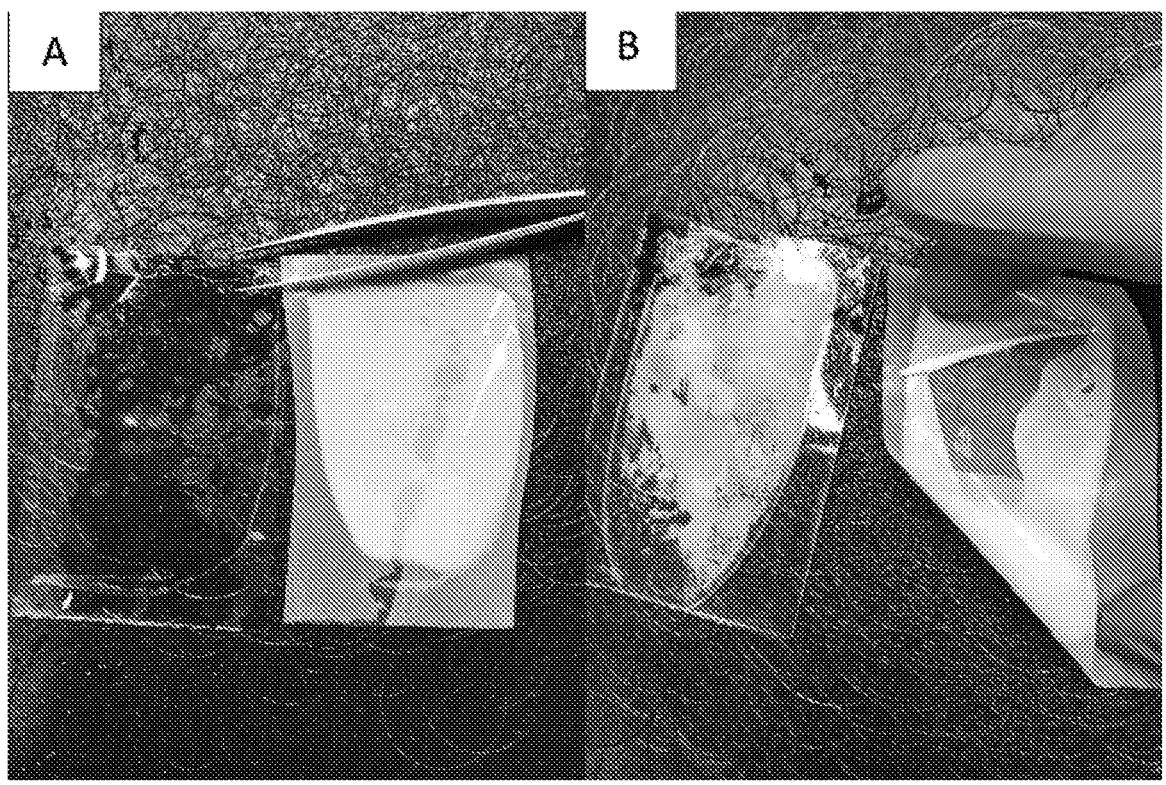
FIG. 4 is photographs of disclosed and comparative example from Example 1. Innovative example material (FIG. 4a) with macrovoids and transition layer integrating into a porous support versus comparative example (FIG. 4b) material without macrovoids or transition layer.

The polymer SV168 is dissolved at 17 wt % polymer concentration in dimethylformamide (DMF)/tetrahydrofuran (THF)/1,4-dioxane (DOX) (33.3 wt %/33.3 wt %/33.3 wt % solution composition), and 20 wt % polymer concentration in DMF/THF (40 wt %/60 wt % solution composition) to provide polymer solutions. These conditions are in line with typically reported casting conditions. The polymer solution is spread on a glass plate with gate height about 260 µm, on top of the glass slide, there is an PET woven support with thickness about 60 µm. The films are evaporated for 40 and 30 seconds, respectively at room temperature and the films are immersed in a water bath. Some of the surface structures are not isoporous for the materials, and both lack both macrovoids and a transition layer, as shown in FIG. 3. Additionally, these comparative example materials tend to delaminate and break away from the porous support upon handling. The innovative examples successfully integrate with the porous support, while the comparative examples delaminate from the porous support, failing to integrate with the support. The macroscopic images are shown in FIG. 4.

Example 2

Example the Disclosure. The SV168 is dissolved at 10 wt % polymer concentration in 1,4-dioxane (DOX)/acetone (ACE) (70 wt %/30 wt % solution composition), and at 17 wt % polymer concentration in dimethylformamide (DMF)/tetrahydrofuran (THF)/1,4-dioxane (DOX) (33.3 wt/33.3 wt %/33.3 wt % solution composition) to provide polymer solutions. The polymer solutions are spread on a glass plate with gate height about 210 μm. There is no porous support material on the glass plate. The films are evaporated for 20 and 40 seconds at room temperature and the films are immersed in a water bath. Upon immersion, the films peel off the glass slide and form freestanding polymer films. The films in Example 3 are cast under the same conditions.

The thickness of the films are measured and recorded. The films are punched into circles with area of 4.9 cm², and dried in oven of 60° C. for more than 24 hours. The dried film masses are recorded and the density is calculated (density=mass/volume). Three identical film sets are cast and the averages and standard deviations are reported.

TABLE 2

Densities of various films

| Sample | Polymer solution | Evaporation time (s) | Density (g/cm³) |
| --- | --- | --- | --- |
| Inventive example IE-1 | SV168 in DOX/ACE | 20 | 0.18 ± 0.05 |
| Inventive example IE-2 | SV168 in DOX/ACE | 40 | 0.18 ± 0.02 |
| Comparative example CE-1 | SV168 in DMF/THF/DOX | 20 | 0.30 ± 0.03 |
| Comparative example CE-2 | SV168 in DMF/THF/DOX | 40 | 0.28 ± 0.02 |

Example 3

Example of the Disclosure. The same set of materials as Example 2 are used in the protein adsorption experiment. The protein adsorption experiment is a modified known procedure (Abetz 2014b) with two different proteins. The protein adsorption test is described in detail above.

Figure 5:
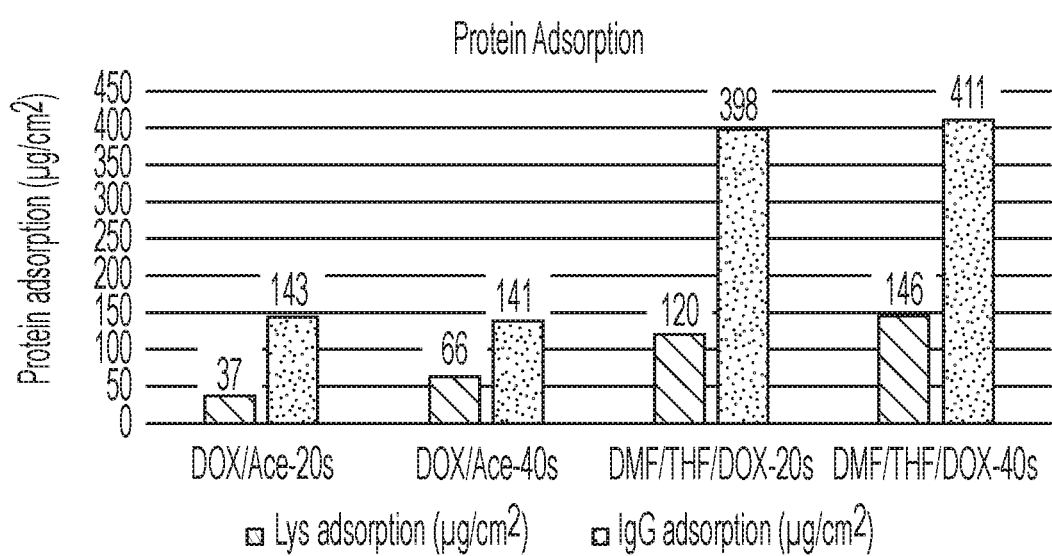
FIG. 5 is a graph displaying the amount of protein adsorption of materials according to various aspects of the present disclosure.

The results are summarized in FIG. 5. For each protein, the adsorption in the inventive example (grey) is much lower compared to the comparative example (black). The Lys adsorption in the comparative example without macrovoids or transition layer is consistent with previous literature (Abetz 2014b). In comparison, the Lys and IgG adsorption are both much lower in isoporous mesoporous asymmetric films with macrovoids and a transition layer.

Example 4

Example of the Disclosure. A mixture of SV block copolymers is also used for making the disclosed films. SV142 and SV221 are dissolved at total 10 wt % polymer concentration in 1,4-dioxane (DOX)/acetone (ACE) (70 wt %/30 wt % solution composition), at various SV ratios. The polymer solutions are spread on a glass plate with gate height about 210 μm. There is no porous support material on the glass plate. The films were evaporated for 40 seconds at room temperature and the films are immersed in a water bath. The IgG adsorption test and density measurements are conducted similarly to Examples above. The results are summarized in Table 3.

TABLE 3

SV mixture films' densities and IgG adsorption

| Sample | Polymer solution | Density (g/cm³) | IgG adsorption (μg/m²) |
| --- | --- | --- | --- |
| Inventive example IE-3 | 2.5 wt % SV142 and 7.5 wt % SV221 | 0.23 | 98 |
| Inventive example IE-4 | 5.0 wt % SV142 and 5.0 wt % SV221 | 0.22 | 90 |
| Inventive example IE-5 | 7.5 wt % SV142 and 2.5 wt % SV221 | 0.22 | 118 |

The invention claimed is:

1. A mesoporous isoporous asymmetric material comprising a diblock copolymer,
   a. a mesoporous isoporous skin layer;
   b. a substructure layer having a thickness of about 1 micron to about 500 microns and a high macrovoid density of at least $10^6$ macrovoids/m²; and
   c. a transition layer between the mesoporous is oporous skin layer and the substructure layer, the transition layer having a thickness of at least 300 nm and a low macrovoid density, wherein the low macrovoid density is defined by the transition layer having a ratio of macrovoids to mesopores of at most $2 \times 10^{-9}$;
   wherein a macrovoid is a void with at least one characteristic length greater than 0.5 microns.

2. The mesoporous isoporous asymmetric material of claim 1, wherein the material is freestanding and exhibits a dried density of less than 0.26 g/cm³; and wherein the material is dried by heating in an oven at 65° C. for 48 hours.

3. The mesoporous isoporous asymmetric material of claim 2, wherein the material exhibits a dried density of less than 0.22 g/cm³.

4. The mesoporous isoporous asymmetric material of claim 1 wherein the transition layer has a thickness of at least about 500 nm.

5. The mesoporous isoporous asymmetric material of claim 1, wherein the material exhibits a radius of curvature to fracture down to about 0.05 inches without cracking; and wherein the radius of curvature to fracture is measured by curving about 1 cm length of the material in a freestanding wet state around a rod or tube of known diameter.

6. The mesoporous isoporous asymmetric material of claim 1, wherein said macrovoids comprise at least one of
   a. finger-like macrovoids consisting of void structures with at least two dimensions greater than 0.5 microns and an aspect ratio greater than 3;
   b. spherical macrovoids consisting of approximately spherioidal void structures with approximate diameter of at least 0.5 microns; and
   c. tear-like macrovoids consisting of void structures with at least two distinctly different characteristic lengths and at least two characteristic lengths greater than 0.5 microns.

7. The mesoporous isoporous asymmetric material of claim 1, wherein the mesoporous isoporous skin layer comprises a pore density of $10^{13}$ pores/m$^2$ to $10^{14}$ pores/m$^2$.

* * * * *